Jan. 29, 1957  E. N. BRODEN  2,779,414
CUTTER FOR TRIMMING RINDS FROM MOLDED ARTICLES
Original Filed Sept. 15, 1951  3 Sheets-Sheet 1

INVENTOR.
BY EDWIN N. BRODEN
W. A. Fraser
ATTORNEYS

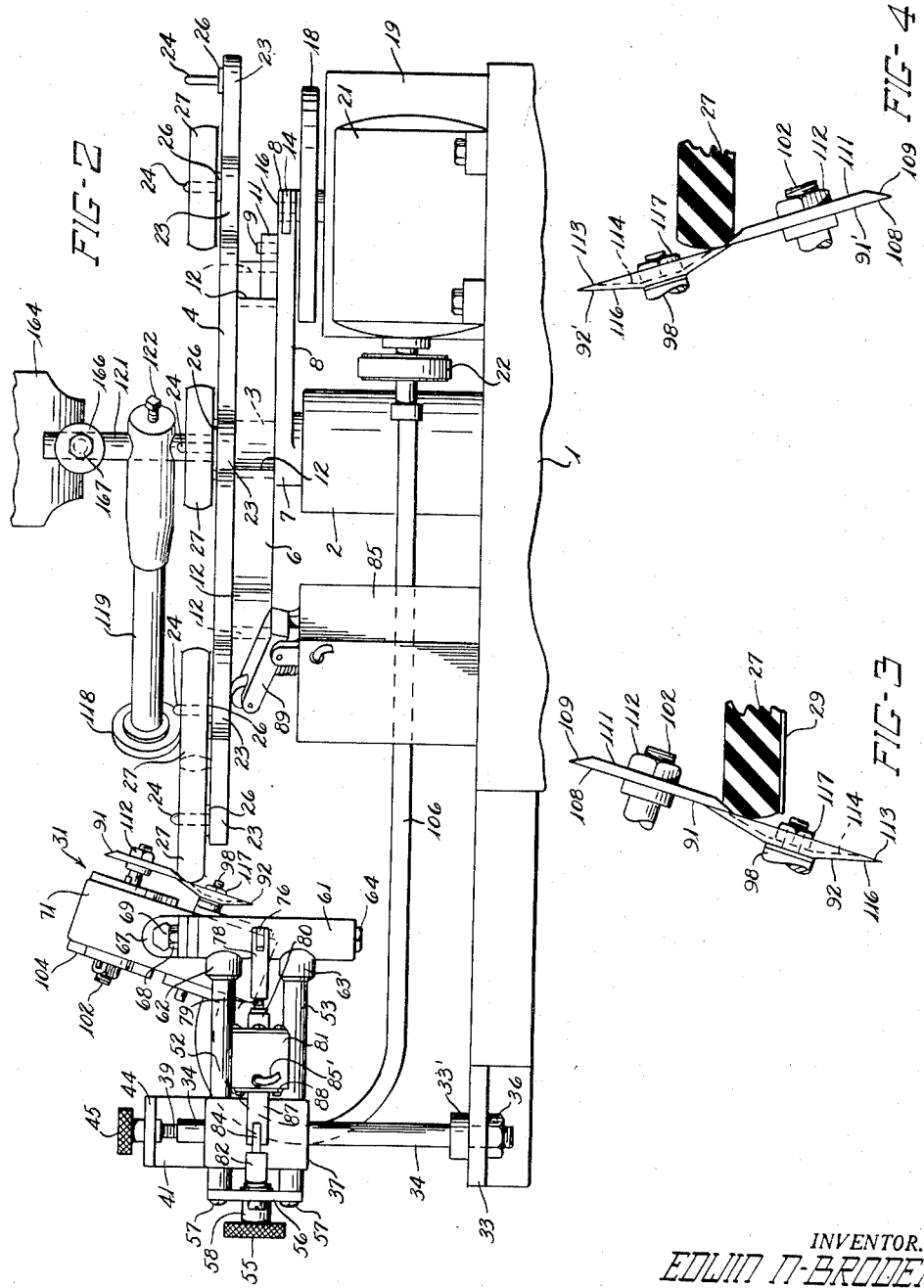

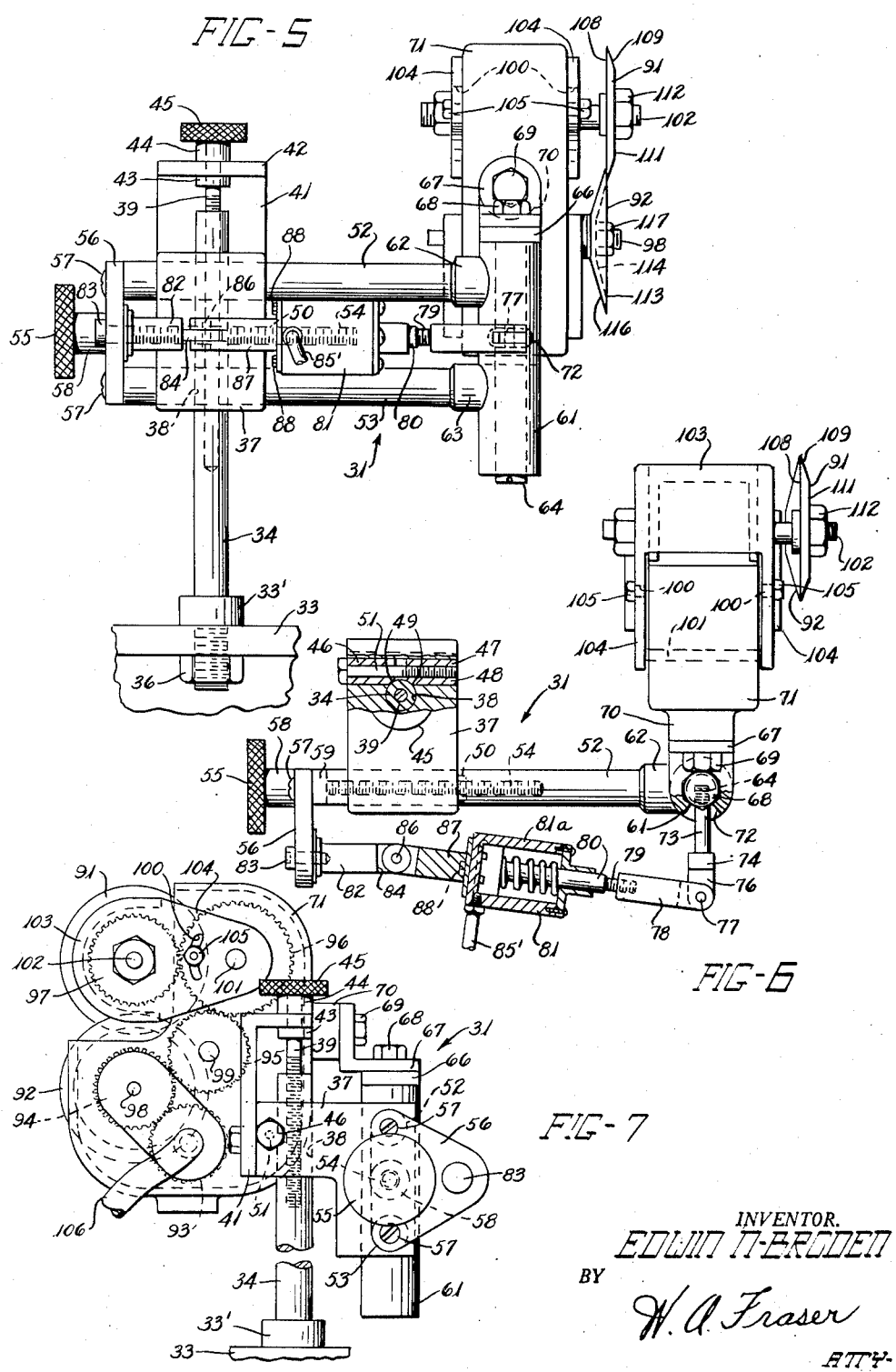

2,779,414
Patented Jan. 29, 1957

United States Patent Office

2,779,414

CUTTER FOR TRIMMING RINDS FROM MOLDED ARTICLES

Edwin N. Broden, Assonet, Mass., assignor to The Firestone Tire & Rubber Company, Akron, Ohio, a corporation of Ohio Original application September 15, 1951, Serial No. 246,747. Divided and this application December 12, 1952, Serial No. 334,033

10 Claims. (Cl. 164—63)

This invention relates to a cutter for trimming rinds from molded, vulcanized articles and, in particular, has to do with the trimming of articles of circular outline, such as caster wheels. In the molding of such articles, outflow between the mold sections results in a circumferential flash or rind and, depending upon the particular mold employed, this may occur in a single line centrally of the rolling face of the wheel being molded, or it may occur at the corners between the rolling face and the respective side faces. The embodiment of the machine which is shown herein is designed to trim wheels having two rinds, but the principles of the invention may be adapted to the trimming of wheels with only one rind. This patent application is a division of my copending United States patent application Serial No. 246,747 filed September 15, 1951 and now abandoned.

Heretofore rinds on caster wheels or similar articles have been removed by hand methods, wherein the excess rubber is sheared off or abraded. Obviously, such methods are prohibitively time consuming. According to the present invention, the articles are neatly trimmed, automatically and rapidly, by mounting them on a turntable and indexing them to a position adjacent a pair of driven, overlapping circular knives, which are thereupon moved into cutting engagement with the rind, and the knives, in severing the rind, also rotate the article.

It is therefore an object to provide a rind-severing device which is certain in its action. More particularly, it is an object to provide a rind-severing machine in which a rotary cutting device is moved into engagement with the work to be cut, after the work has been indexed to a stop.

While the invention is shown as it is applied to the trimming of caster wheels, with appropriate changes the principles of the invention may be used in machines or apparatus for trimming other round or disk-like articles. It will also be appreciated that while the details of the best known and preferred forms of the cutter are illustrated and described, the invention is subject to modifications and improvements within the scope of the invention as set forth in the appended claims.

The objects of the invention are attained by the present invention, a preferred embodiment of which is described in the accompanying specification and illustrated in the drawings, in which:

Figure 2 is an elevation view of the cutting machine of Figure 1.

Figure 3 is a view taken along the line 3—3 of Figure 1.

Figure 4 is a view taken along the line 4—4 of Figure 1.

Figure 5 is an enlarged view in side elevation of one of the cutting units shown in Figures 1 and 2.

Figure 6 is a top plan view of Figure 5.

Figure 7 is an elevation view of the cutting unit of Figure 5 as seen from the left of that figure.

Figure 1:
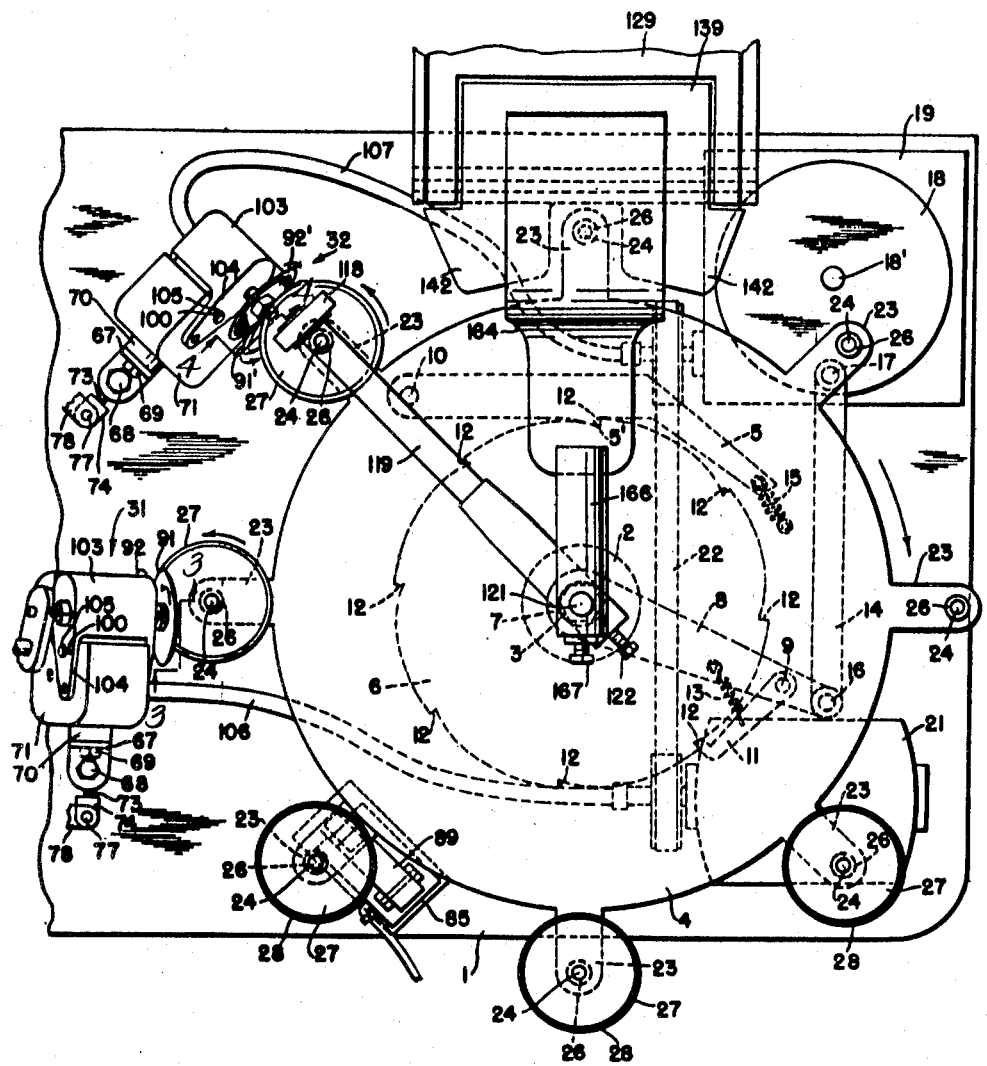
Figure 1 is a top plan view of the cutting machine with parts broken away.

Referring to the drawings by characters of reference, there is shown a bed plate 1, having a central, upright, cylindrical pedestal 2 with a reduced upper end 3, on which is rotatably mounted a turntable 4 and a ratchet wheel 6 which is attached to the turntable. Also rotatably mounted on reduced end 3 of the shaft is the hub 7 of a radius arm 8, carrying a pin 9 near its outer end, on which is pivoted a pawl 11 adapted to engage in notches 12 in the ratchet wheel, to rotate the turntable. This rotation is clockwise. A spring 13 urges the pawl constantly toward the ratchet wheel. Back rotation of the turntable is prevented by a second pawl 5, pivoted at 10 to the bed plate, and having a spring 15 biasing a tooth 5' on the pawl into engagement in notches 12.

The radius arm 8 is reciprocated by a link 14 having one end pivoted thereto, as at 16, and its other end pivoted eccentrically, as at 17, on a disk 18 connected to the output shaft 18' of a reduction gearing unit 19. The latter is driven by a motor 21 through a belt 22. Thus, the indexing of the turntable by the pawl occurs in timed relation to the output of the motor. The motor also drives the trimming knives, later to be described and, therefore, the indexing occurs in timed relation to the rotation of the trimming knives also.

At its outer periphery, the turntable has circumferentially spaced radially extending fingers 23, rotatably mounting upstanding pegs 24 with base flanges 26, the pegs being adapted to receive the central opening of a caster wheel 27, which is to be trimmed.

The particular caster wheels shown are of the type cured in three-piece molds, and hence have two rinds 28, 29 at the edges of the tread. These rinds are trimmed in successive stages by a pair of units indicated generally by the respective numerals 31 and 32. Since these units are structurally identical, except for the arrangement of the circular knives, only one unit need be described in detail.

Mounted on an outwardly extending bracket 33, secured to bed plate 1, is an upright shaft 34 threaded into a bore in a boss 33' on the said bracket and secured by a lock nut 36. A block 37 has a bore 38 received on shaft 34 whereby the said block is slidable vertically. Adjustment of the vertical position of block 37 is effected by a screw 39 threaded into the top of shaft 34. A bracket 41, bolted to the block 37, has a horizontal shelf 42, having a bore receiving an unthreaded portion of screw 39, the said shelf being restrained against motion axially of the screw by a collar 43 and the hub 44 of a head 45 on the screw. Collar 43 may be an integral part of the screw. The block 37 is locked in adjusted position on shaft 34 by means of a pair of wedge pins 46, 47 (Fig. 6) slidable in a bore 48 in the block 37, intersecting the bore 38 which receives shaft 34 and transverse thereto. The inner end of each pin has a tapered portion 49 adapted to contact shaft 34, and the pins are drawn together by a bolt 51 slidable in an axial bore in pin 46 and in axially threaded engagement with pin 47.

Mounted in block 37 for sliding motion are a pair of rods 52, 53, arranged generally horizontal and perpendicular to shaft 34. Sliding adjustment of these rods is effected by a screw 54 threaded in block 37 and secured by a lock nut 50. Screw 54 is anchored in a cross-piece 56 of generally triangular form, which is secured by screws 57 in the ends of rods 52, 53, the screw being restrained against axial motion relative to the cross-piece by a hub 58 of a hand screw 55, and a collar 59.

A vertical sleeve 61 is supported on the other ends of rods 52, 53, the latter being secured, respectively, in tubular bosses 62, 63 extending from the sleeve. A pin 64, mounted for rotation in sleeve 61, has a head 66 to which is secured an angle bracket 67 by means of a bolt 68. The upright leg of bracket 67 is secured by a bolt 69 to a boss 70 on a housing 71 carrying the trimmers and their gearing. Rotation of pin 64 in the sleeve 61 causes swing of the trimmers to and from the turntable.

By tightening the bolt 69, the knife housing 71 may be held in any desired angular position. In Fig. 5, the trimming unit is shown in vertical position, such as it would occupy if the machine were being used for trimming a rind from the center of the tread. In Fig. 3, the unit 31 is tilted forwardly to trim the rind along the top edge of the article.

The mechanism for rotating pin 64 to swing the trimmers is described as follows: Sleeve 61 has an arcuately extending opening 72 (Fig. 5), through which extends a rod 73 threaded into or otherwise secured to pin 64. Rod 73 has a headed portion 74 with a flattened end 76, pivoted by a pin 77 to a clevis 78, into which is threaded the reduced outer end 79 of the piston rod 80 of an air cylinder 81. Attachment of air cylinder 81 to cross-piece 56 is had by means of a rod 82 secured by a screw 83 to the cross-piece and having a flat end 84 on which is pivoted, by a pin 86, a fork 87, which is secured by screws 88 to the air cylinder 81.

The air cylinder is of conventional type, the details of which are shown in Fig. 6, wherein a piston is urged outwardly by air pressure and is returned by spring pressure. The arrangement is such that the air pressure urges the knife housing away from the work and the spring 81a pressure moves the knife housing toward the work. Air under pressure is supplied to the two units through piping 85' from a suitable source through a common control valve of any conventional type located in housing 85 mounted on the bed plate 1 at a point where one of the work supporting fingers 23 comes to rest. A similar line leads from the valve mechanism to the unit 32 so that the two trimming units will move toward and from the work simultaneously. The air pressure in cylinder 81 is relieved each time the turntable is indexed to a stop by means of a valve switch 89 which is so located that it will be actuated by each of the fingers 23 of the turntable. Depression of the switch 89 shuts off air pressure to cylinder 81, venting the latter to atmosphere, and the knife housing is thereupon moved toward the indexed work by spring pressure on the air cylinder piston. As another indexing stroke is begun, the finger 23 moves off the switch 89 and the trimmers are caused to move away from the work by air pressure in cylinder 81.

The knife housing 71 comprises a system of gearing which permits considerable latitude in the distance between the centers of the pair of circular knives 91, 92. Thus the knives may be sharpened repeatedly, without any malfunctioning resulting from the reduction of their radii, and their useful life is therefore increased manifold.

The knife-drive gearing (Fig. 7), journaled in housing 71, comprises a driving gear 93 and a set of serially meshed gears 94, 95, 96, 97. Gear 94 is keyed to a shaft 98 journaled in housing 71, and lower knife 92 is also keyed to this shaft. Gears 95 and 96 are idlers mounted on respective shafts 99, 101, which are journaled in housing 71.

Gear 97 is keyed to a shaft 102, to which the upper knife 91 is also keyed. Shaft 102 is journaled in a housing 103 having a pair of arms 104 journaled on shaft 101 and spanning the housing 71, so that the upper knife is swingable about shaft 101 without disengagement of gear 97 from gear 96. Gears 94, 95 and 97 are of equal pitch diameter so that knives 91, 92 will rotate at the same speed. It will be seen that, with this arrangement, knives 91 and 92 rotate in opposite directions and that shaft 102 of knife 91 may be moved toward shaft 98 of knife 92 without interfering with the effective transmission of power through the gear train. The upper knife is held in its adjusted position by bolts 105, which pass through the curved slots 100 in the arms 104 and are threaded in the sides of the housing 71.

The drive to gear 93 is through a flexible shaft 106 leading from the motor 21. The power input to trimmer unit 32 is through a flexible shaft 107 leading from the input of gear reduction unit 19, which input has the same angular speed as motor 21. Thus the two sets of trimmer disks have equal angular speeds. Since the reduction gear unit 19 operates in timed relation to the motor, and hence to the circular knives, the pawl 11 will advance the ratchet wheel 6 one step, at the end of a predetermined number of revolutions of the knives, which will be one or more revolutions as required for effective trimming.

The knives of the unit 31 shown in Fig. 3 are constructed and arranged to cut the rind 28 from the top edge of the rolling face of a wheel.

Upper knife 91 has a planar face 108 facing housing 71, a beveled face 109 meeting face 108 in a cutting edge, and an outer, planar face 111. This knife is secured on a threaded, reduced end of shaft 102 by a nut 112. Lower knife 92, the overall thickness of which is somewhat greater than knife 91, has an annular planar face 113 surrounding a central cavity 114 in the outer face of the knife and has a beveled face 116 on its inner side meeting face 113 in a cutting edge. This knife is secured to its shaft 98 by nut 117. The faces 108 and 113 of the respective knives are in contact near their peripheries, the preferred amount of radial overlap being about 1/16 inch for knives having a diameter of about 2 1/8 inches.

The cavity 114 is provided to give clearance for the crown on the rolling face of the wheel 27. With the axis of caster wheel 27 vertical, the housing 71 is inclined somewhat to the vertical so that the plane of the contacting, flat faces of the knives is transverse to the rind 28. This plane is substantially tangential to the peripheral surface of wheel 27, but preferably is slightly inclined to such position (see Fig. 1), so as to bite into the rind as it reaches the knives The friction of bevel 109 against the caster wheel causes rotation thereof in the direction shown by the arrows. Final setting of the knives in correct position is determined by the operator, by trial methods, in the case of each type or size of article being trimmed.

An important feature of the machine is the movement of the knives into contact with the work after the turntable has been brought to a stop, for it has been found that if the work is indexed into waiting knives, erratic cuts occur. As the knives contact the work, the rind is received at the intersection of their cutting edges and is sheared at its base. The upper and outermost knife 91 contacts the work 27 with its slant face and rotates it by frictional engagement, so that the cutting of the rind proceeds around the circumference of the wheel. Indexing of the work proceeds at a fixed rate and is so timed that the time between successive phases, that is, the interval when the pawl is returning, is sufficient to permit at least one rotation of wheel 23 by the trimming knives.

The knives of the trimming unit 32, for trimming the bottom rind, are shown in Fig. 4. The knives, indicated at 91' and 92' are identical with knives 91 and 92, respectively, but are arranged in an opposite sense, which may be described as mirror image of the arrangement of knives 91 and 92. Since the slant of these lower knives is such that they tend to lift the wheel being trimmed, a hold-down device is necessary at the trimming unit 32. This is provided in a roller 118, journaled on the end of an arm 119, carried on a bolt 121 threaded in the fixed central shaft of the turntable, the arm being fixed in position by a set screw 122, so that roller 118 is in contact with the upper face of a wheel 27 at a point between the center of the wheel and the trimming point when it is indexed at the station adjacent knives 91', 92'. As the action of the trimming knives at the unit 31 tends to hold the work down upon its support, no hold-down device is required at that point.

The machine having been set in motion, all that is required of the operator is to place the untrimmed articles over the pins 24 during the period of their travel from the ejecting mechanism to the first trimmer. In the particular arrangement shown, the articles first meet the trimmers which trim the rind along the top edge of the article. As the machine comes to a stop in the position shown in Fig. 1, the two trimming mechanisms are moved inwardly, simultaneously, into trimming position by the action of the valve mechanism 89. The knives being in motion, the articles turn about their holding pins until the rinds are removed, the dwell afforded by the turntable indexing mechanism being of sufficient duration to completely trim one side of the article at each of the trimming stations. The trimmed article is now brought to the ejecting station where it is stripped from the pin 24 and delivered to the chute.

Should the machine be employed for trimming a single rind only, one of the trimming units would be idled and the other trimming unit would be angularly adjusted to the location of the rind.

It will be seen that there has thus been provided a trimming cutter which is rapid and completely automatic in its operation, and in which the trimming operation is performed with requisite neatness and precision by virtue of the circular knives. The turning of the work by the knives ensures proper and accurate co-ordination and makes possible an apparatus which is simple in structure. Furthermore, the general arrangement of the knife units renders the cutter highly flexible and, therefore, adapted to a wide range of uses.

While a certain preferred embodiment has been shown and described, the invention is not limited thereby since changes in the size, shape and arrangement, for instance, of the various parts may be made without departing from the spirit or scope of the appended claims.

What is claimed is:

1. In a machine for trimming a rotating work piece, a housing, a pair of peripheral overlapping circular knives journaled in said housing, and mounting means for said housing comprising a first upright, a block slidable and adjustably mounted on said first upright, a support slidably mounted in said block in a direction transverse to said first upright, a second upright carried by said support, a shaft connected to said housing and journaled in said second upright, means to adjust the tilt of said housing with respect to said work piece and an arm projecting from said shaft and adapted to twist said shaft with respect to said second upright, whereby said knives are positioned against said work piece for the trimming operation and withdrawn from the work piece when the trimming operation is complete.

2. In a trimming machine adapted to trim curved work pieces, a housing, a pair of peripherally overlapping circular knives adapted for rotation in opposite directions journaled in said housing, means to rotate said housing toward and away from said work piece, at least one of said knives provided with a means for rotating said work piece during the trimming operation and at least one of said knives having a cavity into which part of the work piece projects during the trimming operation.

3. In a trimming machine adapted to trim rind from two edges of a castor wheel simultaneously, two sets of peripherally overlapping circular knives, a housing for each set of knives in which said knives are journaled for rotation, means to rotate said housing to bring each set of knives against a castor wheel before the trimming operation and to remove each set of knives from the castor wheel at the conclusion of the trimming operation simultaneously, at least one knife in each set with a cavity into which part of the castor wheel projects during the trimming operation, whereby each set of knives closely fits the contour of said castor wheel during the trimming operation.

4. In a machine for trimming a rotating work piece, a housing, cutting means journaled in said housing, and mounting means for said housing comprising a first upright, a block slidably and adjustably mounted on said first upright, a support slidably mounted in said block in a direction transverse to said first upright, a second upright carried by said support, a shaft connected to said housing and journaled in said second upright, means to adjust the tilt of said housing with respect to said work piece and means connected to said shaft to move said cutting means to said work piece for the trimming operation and from said work piece when the trimming operation is complete.

5. In a machine for trimming a rotating work piece, a housing, a pair of peripheral overlapping circular knives journaled in said housing, and mounting means for said housing comprising a first upright, a block slidably and adjustably mounted on said first upright, a support slidably mounted in said block in a direction transverse to said first upright, a second upright being hollow and having an aperture in the wall thereof carried by said support, a shaft connected to said housing and journaled in said second upright, means to adjust the tilt of said housing with respect to said work piece and means connected to said shaft through said aperture to twist said shaft and move said knives to said work piece for the trimming operation and from said work piece when the trimming operation is complete.

6. In a machine for trimming a rotating work piece, a housing, cutting means journaled in said housing, and mounting means for said housing comprising a first upright, a block slidably and adjustably mounted on said first upright, a support slidably mounted in said block in a direction transverse to said first upright, a second upright being hollow and having an aperture in the wall thereof carried by said support, a shaft connected to said housing and journaled in said second upright, means to adjust the tilt of said housing with respect to said work piece and an opening in said second upright, an arm attached to said shaft and projecting through said opening, and means attached to said arm to reciprocate the projecting end thereof, whereby to tilt said housing with respect to said work piece, for the trimming operation, means connected to said shaft through said aperture to twist said shaft and move said knives to said work piece for the trimming operation and from said work piece when the trimming operation is complete.

7. In a cutting device adapted to trim curved work pieces comprising a first disc-shaped knife having a planar face on one side thereof and a beveled face on the other side thereof merging with said planar face to form a circular edge; a second disc-shaped knife having an annular planar face on one side thereof framing a central dish-like cavity and a beveled face on the other side of said second knife merging with said annular planar face to form a circular edge, the planar face of the first knife abutting and overlapping in the radial direction the annular face of the second knife.

8. In a cutting device adapted to trim curved work pieces comprising a first disc-shaped knife having a planar face on one side thereof and a beveled face on the other side thereof merging with said planar face to form a circular edge; a second disc-shaped knife of greater thickness having an annular planar face on one side thereof framing a central dish-like cavity and a beveled face on the other side of said second knife merging with said annular planar face to form a circular edge, the planar face of the first knife abutting and overlapping in the radial direction the annular face of the second knife.

9. In a cutting device adapted to trim curved work pieces comprising a first disc-shaped knife having a planar face on one side thereof and a beveled face on the other side thereof merging with said planar face to form a circular edge; a second disc-shaped knife having an annular planar face on one side thereof framing a central dish-like cavity and a beveled face on the other side of said second knife merging with said annular planar face to form a circular edge, the planar face of the first knife abutting and overlapping in the radial direction the annular face of the second knife and means to drive each said knives in opposite directions.

10. In a pair of knives adapted to trim curved work pieces comprising a first disc-shaped knife having a planar face on one side thereof and a beveled face on the other side thereof merging with said planar face to form a circular edge; a second disc-shaped knife having an annular planar face on one side thereof framing a central dish-like cavity and a beveled face on the other side of said second knife merging with said annular planar face to form a second edge, the planar face of the first knife abutting and overlapping in the radial direction the annular face of the second knife at least 1/16 of an inch.

References Cited in the file of this patent

UNITED STATES PATENTS

| | | |
|---|---|---|
| 402,560 | Carlsen | May 7, 1889 |
| 586,808 | Dittman | July 20, 1897 |
| 1,280,798 | Midgley | Oct. 8, 1918 |
| 1,403,740 | Day | Jan. 17, 1922 |
| 1,628,845 | Jackson | May 17, 1927 |
| 1,951,529 | Possnett | Mar. 20, 1934 |
| 2,027,490 | Pendleton et al. | Jan. 14, 1936 |
| 2,105,131 | Smith | Jan. 11, 1938 |
| 2,187,211 | McKinley | Jan. 16, 1940 |
| 2,308,432 | Johnson | Jan. 12, 1943 |
| 2,333,958 | Smith | Nov. 9, 1943 |
| 2,601,810 | James | July 1, 1952 |